Sept. 13, 1960  J. B. PARSONS  2,952,127
POWER STEERING AND AUXILIARY MOTOR COMBINATION FOR AUTOMOBILES
Filed Nov. 16, 1954  3 Sheets-Sheet 1
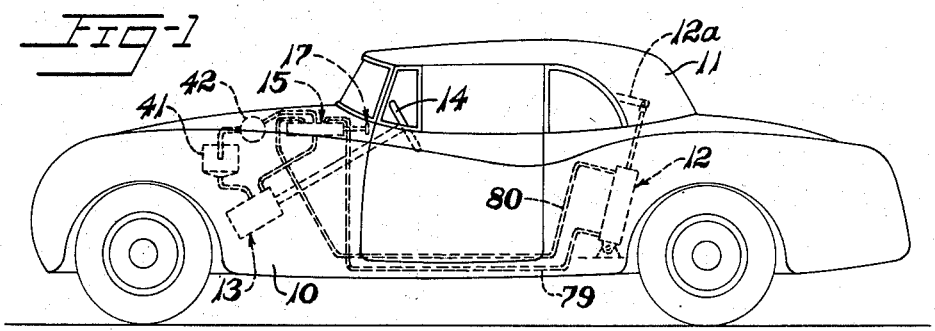
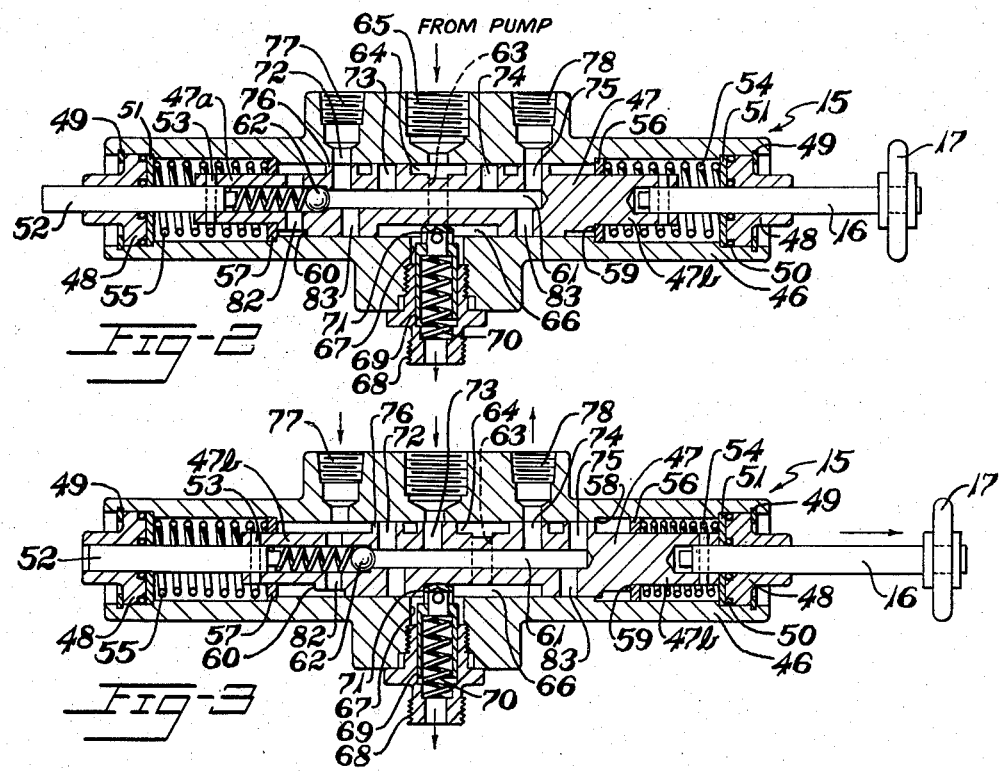
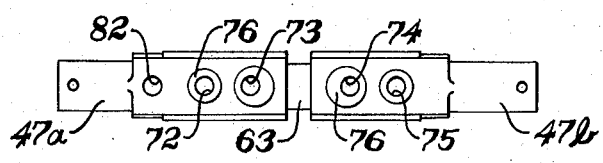
INVENTOR.
JOHN B. PARSONS
BY
Malcolm W. Fraser
ATTY.

Sept. 13, 1960 J. B. PARSONS 2,952,127
POWER STEERING AND AUXILIARY MOTOR COMBINATION FOR AUTOMOBILES
Filed Nov. 16, 1954 3 Sheets-Sheet 2
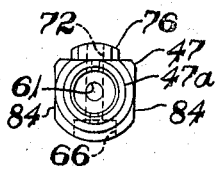
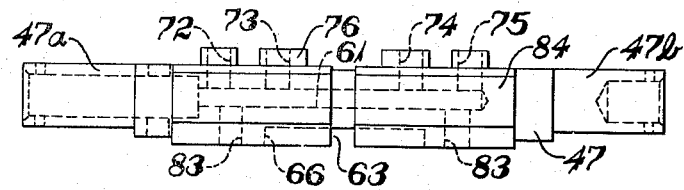
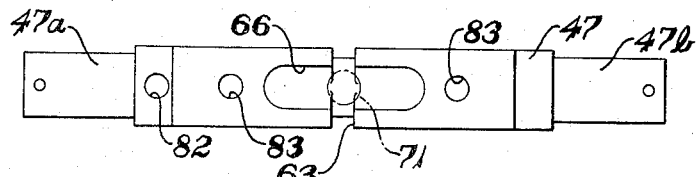
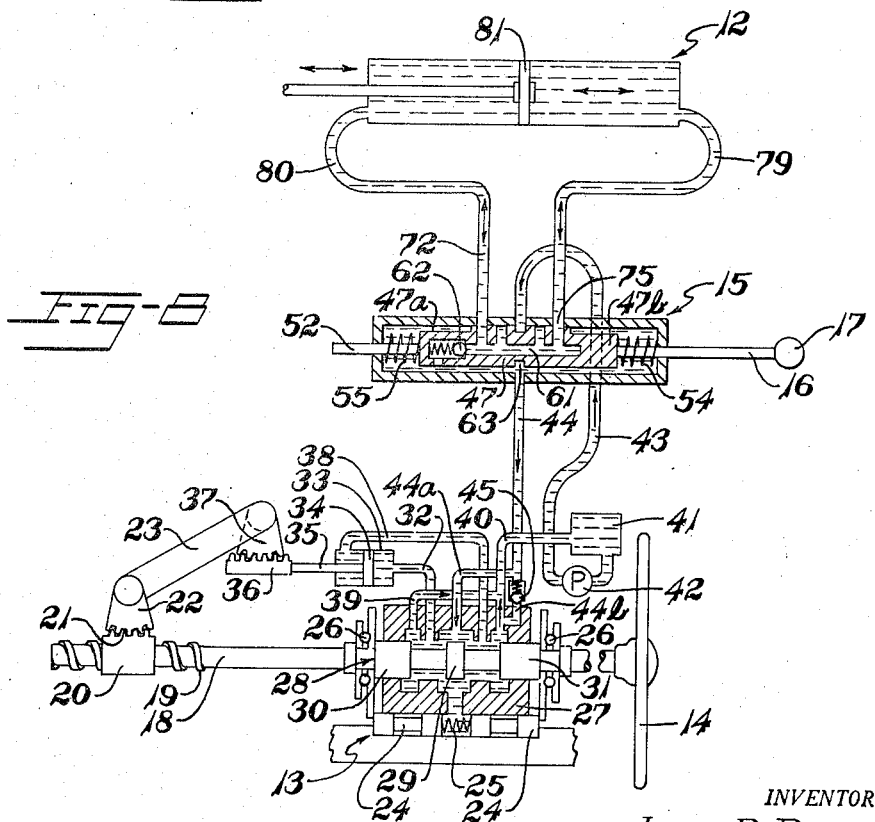
INVENTOR.
JOHN B. PARSONS
BY
ATTY.

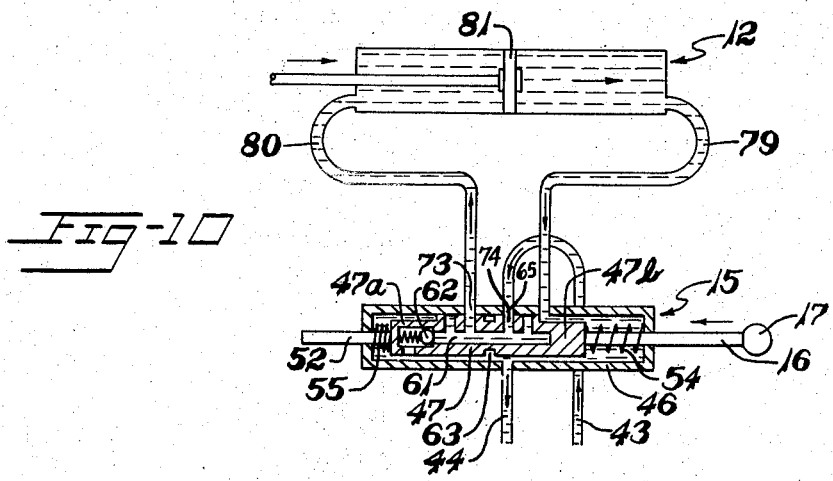
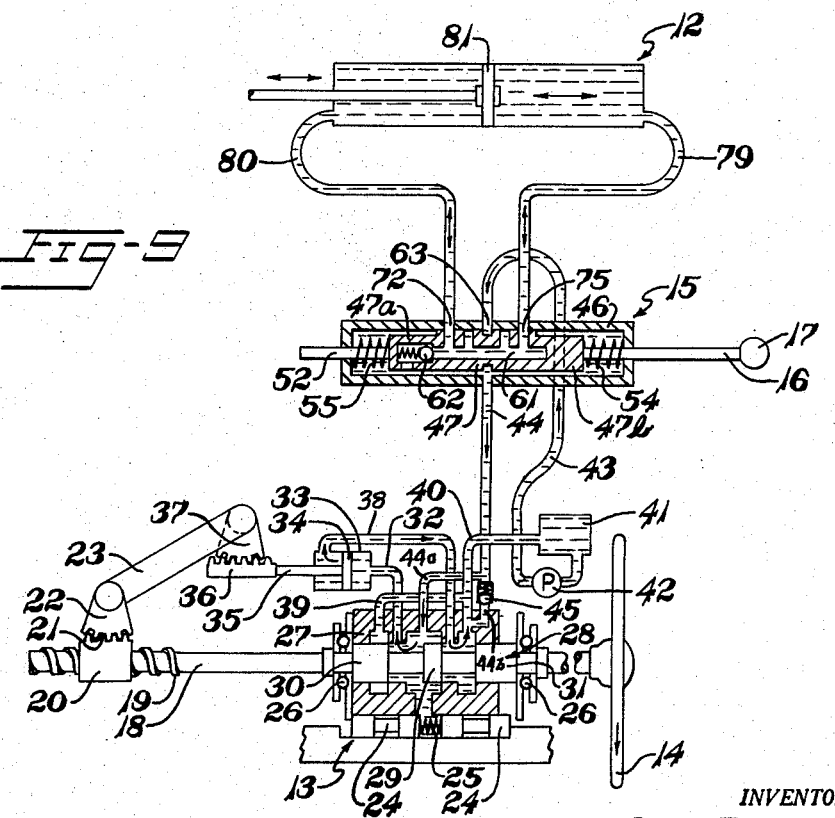

United States Patent Office 2,952,127
Patented Sept. 13, 1960

2,952,127

POWER STEERING AND AUXILIARY MOTOR COMBINATION FOR AUTOMOBILES

John B. Parsons, 1210 River Road, Maumee, Ohio

Filed Nov. 16, 1954, Ser. No. 469,241

2 Claims. (Cl. 60—52)

This invention relates to automotive vehicles but more particularly to such vehicles equipped with power steering and power operated devices, such as convertible tops, power operated windows and the like.

Many automobiles are equipped with power steering devices employing liquid under pressure as the power medium. These same automobiles not infrequently have power operated tops, windows, seats and the like, and that necessitates the use of several pump units for generating the required liquid pressures. Consequently, the cost is high and the required space is considerable. It is a desideratum to utilize the same pump for use only only for power steering but also for the operation of auxiliary motors to operate the top and/or other accessories of the above character.

An object is to produce a system by which the power steering operating pump can be selectively employed for the operation of an auxiliary motor without interferring with power steering or requiring any major change in the power steering structure or arrangement.

Another object is to produce a system of the above character by which the power steering can be operated either concomitantly with the auxiliary motor, or either can be operated alone.

A further object is to produce a system of the above character in which the auxiliary motor is double acting and is connected to raise and lower the so-called convertible top, for example, the arrangement being such that the pressure fluid delivered thereto is maintained below the maximum pressure produced by the pump, a supply of pressure fluid being available at all times to the power steering mechanism even though the flow to the auxiliary motor may be obstructed.

A still further object is to produce a new and improved valve mechanism for such conjoint uses.

Other objects and advantages will hereinafter appear and for purposes of illustration but not of limitation, an embodiment of the invention is shown on the accompanying drawings, in which Figure 1 is a side elevation of an automobile of the convertible type equipped with power steering mechanism and having power actuating mechanism for the folding top;

Figure 2 is a longitudinal sectional elevation of the valve assembly which controls the flow of pressure fluid to the top operating piston and cylinder assemblies, and is in neutral position;

Figure 3 is a longitudinal sectional view similar to Figure 2, but showing the valve assembly with the valve shifted from neutral position to an operative position to effect piston movement in the top operating piston and cylinder assemblies;

Figure 4 is a top plan view of the spool valve shown in Figures 2 and 3;

Figure 5 is a side elevation of the spool valve;

Figure 6 is a bottom plan view of the spool valve;

Figure 7 is an end elevation of the spool valve;

Figure 8 is a diagrammatic view of the power steering mechanism, the control valve and a top operatnig piston and cylinder assembly, the various parts being in neutral position so that the power steering is not operating nor is pressure fluid being delivered for operating the piston in the piston and cylinder assembly;

Figure 9 is a diagrammatic view similar to Figure 8, showing the power steering mechanism in operating position for effecting steering of the automobile by hydraulic power; and Figure 10 is a diagrammatic view of a part of the system showing the control valve actuated to such position as to drive the top operating piston in one direction of its movement.

The illustrated embodiment of the invention comprises an automobile 10 of the convertible type having a folding top 11 which is hydraulically actuated to folded or open position and to closed or covering position by piston and cylinder assemblies 12, only one of such units being shown and the same being operatively connected to the usual top linkage 12a as will readily be understood by those skilled in this art.

The automobile is equipped with power steering mechanism generally indicated at 13 and including the usual steering wheel 14. For controlling the operation of the auxiliary motors (in this instance the same being linear motors or piston and cylinder assemblies 12), is a control valve unit 15. The valve unit 15 has an actuating rod 16 which projects through the instrument panel and has an operating knob 17 in a position convenient for the operator.

The power steering mechanism is well known to those skilled in this art as the Saginaw integral type and, so far as this invention is concerned, no change is made in such mechanism except for certain conduit arrangements, as will be hereinafter described. In this hydraulic or power steering mechanism, the steering shaft 18, on the outer end of which is the usual steering wheel 14, has an integral worm 19 which is engaged by an axially movable nut 20. On the outside of the nut 20 are rack teeth 21 which mesh with the teeth of a gear sector 22 fixed to a pitman shaft 23 suitably connected by linkage (not shown), to the front steering wheels for effecting turning thereof in one direction or the other. It will be understood that movement of the nut 20 in one direction or the other is imparted to thrust bearings 26 on the shaft 18 and which are spaced from each other and between which are disposed a series of plungers which have interposed centering springs 25 (only one assembly of this character being shown, but it will be understood that there are several of these units in actual practice). Thus the movement of the thrust bearings in one direction or the other is opposed by the springs 25 and for the hydraulic steering to be effective, the thrust load must exceed the force of the springs 25.

The plunger and spring assemblies surround a housing 27 in which is disposed a spool valve 28 forming an integral part of the steering shaft 18. The spool valve 28 is made up of a centrally disposed collar 29 on opposite sides of which are disposed in spaced relationship collars 30 and 31. Leading from the inside of the valve housing between the collars 29 and 30 is a conduit 32 which extends to one end of a power cylinder 33 in which is reciprocal a piston 34 having a piston rod 35 extending from the cylinder and having a rack 36 at its outer end. Meshing with the teeth on the rack 36 are teeth of a gear sector 37 fixed to the pitman rod 23. From the opposite end of the cylinder 33 extends a conduit 38 which terminates in the valve housing between the spool valve collars 29 and 31. Leading from the valve housing in the region between the conduit 32 and the inner end of the housing is a conduit 39 which joins a conduit 40 which extends from the valve housing between the inner end of the conduit 38 and the forward end of the valve housing. The conduit 40 extends to a liquid reservoir 41. Interposed in a conduit 43 leading from the reservoir 41 is a hydraulic pump 42. The pump 42 is continuously driven from the automobile engine. Thus so long as the automobile engine is operating, the pump 42 is in operation. The driving connection for the pump is not illustrated but the same will be understood by those skilled in this art. As will be hereinafter described, a conduit 43 extends to the control valve 15 and leading from the control valve 15 is a conduit 44 having a branch 44a extending to the valve housing 27 at a point between the inner ends of the conduits 32 and 38. Another branch of the conduit 44, designated as 44b, connects to the conduit 40 and interposed in the branch 44b is a spring pressed check valve 45.

In operation of the power steering, it will be understood that upon turning of the steering wheel 14 to the left or in the direction of the arrows shown on Figure 9 and an effort expended in excess of a predetermined force, the centering springs 25 are compressed and the shaft 18 is shifted to the right of Figure 8 to the position of the valve shown in Figure 9, causing the valve collar 30 to close the conduit 39 so that liquid under pressure enters the conduit 32 to drive the piston 34 to the left of the figure and thereby through the gear connection turn the pitman rod 23 for effecting turning of the front wheels of the automobile. Since the pump 42 builds up pressure, liquid is forced against the inner end of the plungers 24, thereby tending to force the shaft 18 and the valve 28 back to its neutral position. In the neutral position, it will be understood that there is a constant circulation of liquid, particularly as indicated by the arrows on Figure 8, passing from the pump through the conduit 43, thence through the conduit 44, the branch 44a, into the valve housing and from there through the conduit 39 and conduit 40 through the reservoir 41 with which the pump is in communication. This circulation of liquid under pressure is interrupted by turning movement of the steering wheel 14 in one direction or the other. By turning the steering wheel 14 in the direction opposite to the arrow shown on Figure 9, the reversed arrangement will be effected so far as the valve 28 is concerned and liquid will then be forced into the opposite end of the power cylinder 33 to effect movement of the piston 34 and associated parts in the opposite direction.

The spring tensioned check valve 45 is in closed position during the operation of the pump 42, but when the pump is not in operation and the steering gear is manually operated, the valve 42 opens to by-pass the pump so that oil can flow from one end of the cylinder 33 to the other during reciprocatory movement of the piston 34.

The control valve unit 15 for the auxiliary motors (in this instance the piston and cylinder assemblies 12) comprises an open ended cylinder or housing 46 in which is mounted for longitudinal sliding movement a spool valve 47 having reduced cylindrical end portions 47a and 47b. Opposite ends of the housing 46 are closed by plugs 48 which are held in place by snap rings 49 and at the inner end of each plug and engaging the walls of the housing is a rubber seal 50. A washer 51 bearing against a shoulder in the housing provides an abutting wall for the inner end of each of the closure plugs 48. The valve actuating rod 16 is slidable through one of the end plugs 48 and slidable through the other end plug is a guide pin or rod 52, the inner end of which extends into the adjacent end of the valve and is secured by a pinned connection 53. The inner end of the actuating rod 16 extends into a socket in the adjacent end of the valve and has a similar pinned connection.

At opposite ends of the spool valve 47 are coil springs 54 and 55 respectively, which normally hold the valve in its central or neutral position. The springs bear at their outer ends against the adjacent washer 51. At its inner end the spring 54 bears against a washer 56 which in turn abuts against a shoulder 58 on the housing, thereby limiting the inward movement of the spring. The washer 57 against which the inner end of the spring 55 abuts also is adapted to seat against a shoulder in the housing.

On the reduced end portion 47a of the valve is a shoulder 60 which is adapted to abut against the adjacent washer 57 when the valve is moved to the left within the housing. A shoulder 59 on the valve extension 47b is adapted to abut against the adjacent washer 56 when the valve is moved to the right within the housing, thereby to compress the coil spring 54.

Disposed within the valve 47 centrally thereof and extending longitudinally for a portion of its length, is a passage 61 and, as shown on Figure 2, at the left of the passage 61 is a spring tensioned relief valve 62 which normally prevents the passage of liquid under pressure to a transverse valve passage 82.

It will be understood that the central portion of the valve is, in general, cylindrical so that it slides within the cylindrical bore of the housing 46. However, the upper portion of the valve is spaced from the adjacent walls of the housing, as will hereinafter appear. Formed centrally of the valve is an annular groove 63 which, in the central or neutral position of the valve, communicates with a space 64 which in turn communicates with a threaded outlet opening 65 with which the conduit 43 leading from the pump 42 communicates, as indicated on Figures 8 to 10. At the lower portion of the valve the central annular groove 63 communicates with a longitudinally elongate groove 66 (Figure 6).

Communicating with the groove 66 is a screw-threaded opening 67 which receives a screw fitting 68. The fitting 68 contains a sleeve 69 which is open at the outer end and disposed therein is a coil spring 70 which urges the sleeve into engagement with the valve. The sleeve 69 has a closed end 71 and directly beneath the closed end is a plurality of radially disposed apertures. As indicated on Figure 6, the end portion 71 does not completely occupy the lateral dimensions of the groove 66, but is such that liquid passing from the annular groove 63 can flow around and freely into the lateral ports of the sleeve to provide substantially unrestricted liquid flow. The spring tensioned sleeve engaging in the groove 66 holds the valve against turning movements but allows longitudinal shifting movements thereof, due to the elongation of the groove 66.

Extending upwardly from the central groove 61 and arranged in spaced relation is a series of ports, two being arranged on opposite sides of the central annular groove 63, these ports being 72, 73, 74 and 75. It will be understood that the top of the valve on each side of the groove 63 is flattened off so as to provide spacing between the valve and the adjacent walls of the valve housing. However, the area adjacent each of the ports 72, 73, 74 and 75 is provided with a land 76, and, as indicated on Figure 4, these lands may be of different shapes. In the main, however, the lands are relatively narrow walled and provide a sliding fit with the walls of the housing and consequently are arcuate as indicated on Figure 7.

The lands 76 limit the area subjected to the liquid pressure which tends to force the valve laterally or downwardly. Since the fit between the lands and the valve housing is not a liquid-tight one, a certain amount of liquid under pressure will escape past the edges of these ports and will exert downward pressure against the lands, but since the combined area of these several lands is relatively small, the lateral pressure exerted by the liquid is not sufficiently great to interfere with the shifting movement required in the operation of the valve. The transverse dimension of each land 76 is such that it can never close off the respective port in any position of the valve. Thus the principal purpose of the lands is to reduce the area against which the liquid pressure exerts a lateral force which, of course, if great enough, would bind the valve against movement in the housing.

Leading downwardly from the central passage 61 and arranged at opposite sides of the elongate groove 66 are ports 83 which are pressure counterbalancing ports, allowing leakage between the valve and the adjacent housing walls. These ports in conjunction with the pressure exerted by the coil spring 70 afford adequate balance to the fluid pressure exerted on the lands 76 for allowing the valve to be shifted longitudinally without difficulty.

On opposite sides of the screw-threaded housing opening 65 which enables liquid under pressure to be introduced to the valve housing, are screw-threaded openings 77 and 78 communicating with the inside of the valve housing. As shown on Figures 8 to 10, the conduit 79 leads from the screw-threaded opening 78 to one end of the cylinder which forms a part of the piston and cylinder assembly 12. A conduit 80 extends from the screw-threaded opening 77 of the valve housing to the opposite end of such cylinder. As shown, a piston 81 reciprocates in such cylinder and has a piston rod which extends to the folding top linkage 12a.

On opposite sides of the valve 47, particularly as shown in Figure 7, are flat surfaces 84 which extend from end to end of the valve and provide spaces between the side walls of the valve and the cylinder to afford liquid passages, as will be more fully hereinafter described.

From the above description, it will be understood that the pump 42 which is operating continuously so long as the automobile engine is operating, forces liquid under pressure through the conduit 43 to the valve housing 46 where the liquid enters the threaded opening 65 and then passes around the central groove 63 to the elongate groove 66. From the groove 66 pressure fluid passes through the lateral ports in the end portion of the sleeve 69 and thence through the fitting to the conduit 44 and thence to the power steering housing 27. If the power steering mechanism is not in operation, the liquid is merely circulated. However, if the power steering is in operation, as indicated in Figure 9, the path of the pressure fluid through the control valve housing 46 is as above described. The control valve 15 may be shifted in one direction or the other so as to actuate the pistons of the assemblies 12 in one direction or the other at the same time that power steering is operating. Thus it is possible for the convertible top to be raised or lowered at the same time that the automobile is power steered.

As indicated in Figure 10, by shifting the control valve to the left by pushing on the knob 17, the valve port 74 is placed in communication with the inlet aperture 65 so that liquid under pressure flows through the port 74 into the central passage 61 and then out through the port 64 to the threaded aperture 77 and the conduit 80. From the conduit 80, liquid enters the left-hand end of the operating cylinder (Figure 10), to drive the piston 81 to the right of the figure. Inasmuch as the entire system is filled with liquid, it will be manifest that the liquid on the right side of the piston 81 is forced out and passes through the conduit 79 and into the space between the flat top of the valve and the housing walls. From this area the liquid can pass through the spaces provided between the flat sides 84 and the cylindrical walls of the housing to the annular groove 63, and thence into the elongate groove 66 from which it passes through the apertured sleeve 69 to the conduit 44 and thence to the power steering unit.

In the event that the piston 81 continues its movement until it reaches the end of the cylinder, or for any reason is restrained so that it cannot move, then the pressure built up will be sufficient to unseat the relief valve 62 for allowing liquid to pass directly from the central passage 61 through the spaces provided by the flat side walls 84 to the outlet conduit 44 as above explained. It should be understood that the pressure relief valve 62 operates at a pressure less than is required for normal power steering operations.

Figure 3 indicates the position of the parts of the control valve 50 when shifted in the opposite direction, and it is believed that the above description will suffice to make the operation clear to those skilled in this art without further description.

It will be understood that if necessary, the top 11 can be raised or lowered manually when the control valve 15 is in its intermediate or neutral positions. Due to the differential volumetric capacity of the piston and cylinder assemblies due to the area within the cylinder occupied by the piston rod, if greater volume of pressure fluid is moved when operated manually, then the pressure relief valve 62 yields to allow excess fluid to pass into the system.

From the above description, it will be manifest that I have produced an exceedingly simple and efficient system whereby the hydraulic pump used for operating the power steering can be utilized for other purposes. The arrangement is such that both power steering and top operating can be operated at the same time. It is also manifest that the system is such that either power steering or top operating can be operated alone.

Although I have shown and described a linear motor which is adapted for top operation, it is understood that a double acting rotary motor could be operated as advantageously. Numerous changes in details of construction, arrangement and operation may be effected without departing from the spirit of the invention especially as defined in the appended claims.

What I claim is:

1. In a hydraulic power system, a constantly operating pump having an inlet and an outlet; a first double-acting fluid motor having opposite sides and first control valve means therefor, said first control valve means having inlet and outlet ports; a second double-acting fluid motor and second control valve means therefor, said second control valve means having inlet and outlet ports; fluid conduit means serially connecting the pump outlet with the inlet port of the first control valve means, the outlet port of the first control valve means with the inlet port of the second control valve means, and the outlet port of the second control valve means with the inlet of the pump; said first control valve means having a manually controllable member and providing a fluid by-pass circuit from the inlet port thereof to the outlet port thereof, and a first motor actuating circuit running from the inlet port thereof to a selected side of said first fluid motor; means in said first control valve means providing a fluid return path from the non-selected side of the first fluid motor to the outlet port of the first valve, and fluid relief passage means connecting said actuating circuit and the outlet port thereof, said manually controllable member being shiftable from a neutral position in which said by-pass circuit connects the inlet and outlet ports of the first control valve means to a pair of non-neutral positions in which the inlet port of the first valve connects with a selected side of the first motor while the non-selected side connects with the outlet port thereof; said fluid by-pass circuit and said actuating circuit being mutually exclusive whereby said fluid relief passage is connected to the inlet port of said first control valve only when said manually controllable member is in a non-neutral position; a relief valve in said relief passage means, and bias means for holding said relief valve closed against predetermined pressure of fluid in said actuating circuit and permitting said relief valve to open in response to fluid pressure in said actuating circuit exceeding said predetermined pressure.

2. The combination claimed in claim 1, said predetermined pressure being substantially less than the normal operating pressures of said second fluid motor.

(References on following page)

References Cited in the file of this patent

UNITED STATES PATENTS

| | | |
|---|---|---|
| 1,943,061 | Douglas | Jan. 9, 1934 |
| 2,111,134 | Allin | Mar. 15, 1938 |
| 2,112,466 | Maloon | Mar. 29, 1938 |
| 2,363,179 | Harrington et al. | Nov. 21, 1944 |
| 2,363,760 | Waldie | Nov. 28, 1944 |
| 2,403,325 | Armington | July 2, 1946 |
| 2,552,848 | Gabriel et al. | May 15, 1951 |
| 2,569,766 | Klein et al. | Oct. 2, 1951 |
| 2,594,664 | Livers et al. | Apr. 29, 1952 |